UNITED STATES PATENT OFFICE.

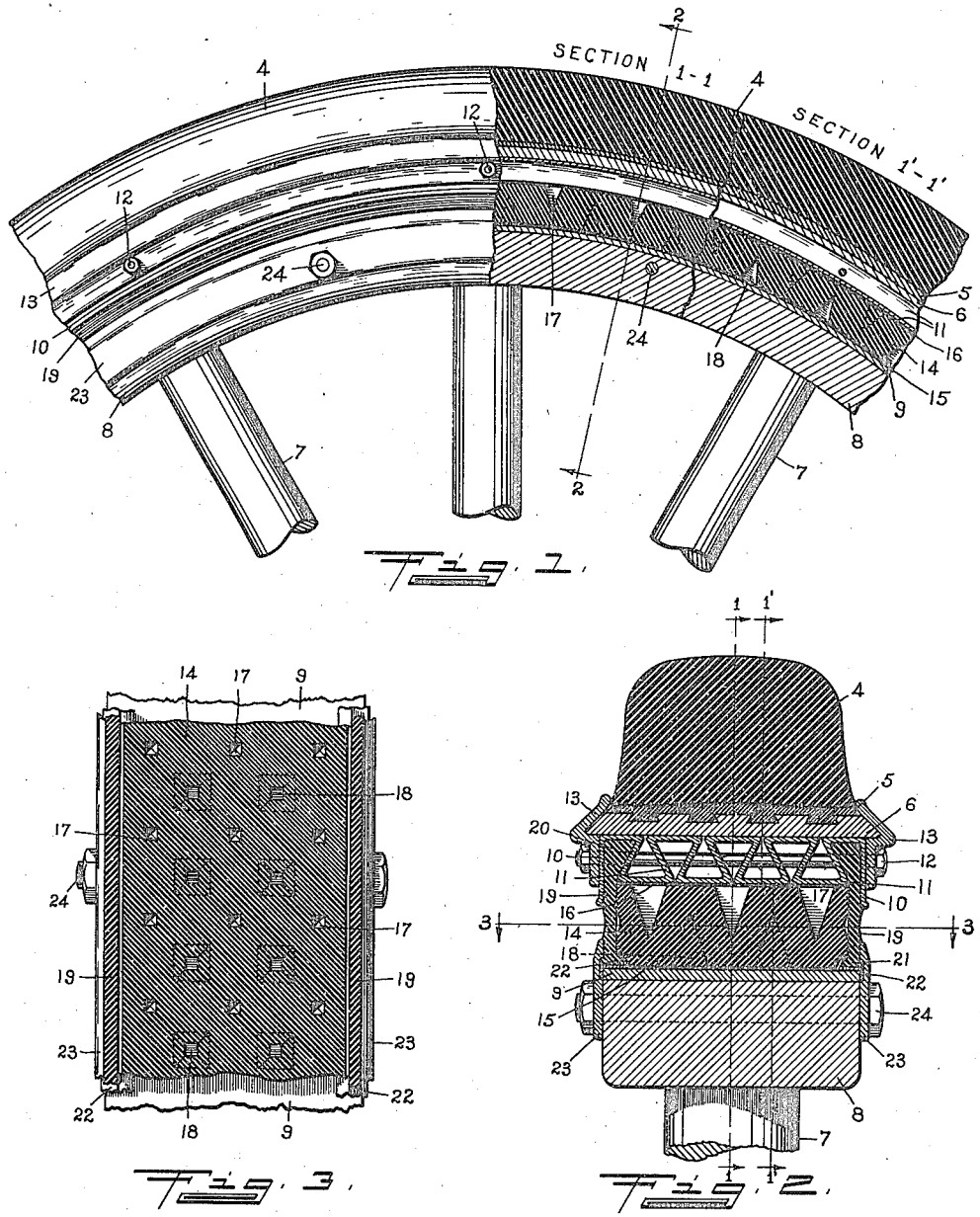

ARTHUR L. RUNYAN, OF OMAHA, NEBRASKA, ASSIGNOR TO RUNYAN CUSHION WHEEL COMPANY, OF OMAHA, NEBRASKA, A CORPORATION.

RESILIENT WHEEL.

1,227,494.      Specification of Letters Patent.      Patented May 22, 1917.

Application filed October 7, 1916. Serial No. 124,416.

*To all whom it may concern:*

Be it known that I, ARTHUR L. RUNYAN, a citizen of the United States, and a resident of Omaha, in the county of Douglas and State of Nebraska, have invented certain new and useful Improvements in Resilient Wheels, of which the following is a specification.

My invention relates to resilient tires and wheels, and it is the object thereof to provide a tire for vehicle wheels, having substantially the resilience and shock-absorbing capacity of a pneumatic tire, but so constructed as to be more durable than a pneumatic tire. A further object of my invention is to provide means by which a standard wheel-rim and a standard solid-rubber tire may be employed, but with a resilient cushioning-body arranged between them so as to absorb the heavier shocks which are not taken up by the ordinary solid-rubber tread. A further object of my invention is to provide means for stiffening and reinforcing the rim on which the solid-rubber tire is mounted, so as to prevent distortion thereof when the cushioning-body is compressed at one side of the wheel. A further object of my invention is to provide a special cushioning-body, for use as above mentioned, the same being so constructed as to offer uniformly increasing resistance to compression by flowing into and reducing the volume of confined air-spaces in the body of the cushioning material. A further object of my invention is to provide resilient confining members at the sides of the cushioning body, and means for securing the inner and outer edges of said members to the inner and outer rings between which the cushioning-body is retained. The specific means for attaining the foregoing, and further objects of my invention, will be fully set forth hereinafter.

In the accompanying drawings Figure 1 is a partial side view of a portion of a wheel and tire embodying my invention, and partially vertical sectional views on the planes 1—1 and 1'—1' of Fig. 2, Fig. 2 is a transverse section of the same on the plane of the line 2—2 of Fig. 1, and Fig. 3 is a circumferential section on the plane of the line 3—3 of Fig. 2.

In the tire provided with my invention the tread is formed by a standard solid-rubber tire having a resilient outer portion 4 of rubber or rubber composition, formed integrally with an inner portion 5 of somewhat harder composition, the latter being the connecting medium between the portion 4 and a metal ring or rim 6 which is grooved or recessed peripherally so that portions of the material 5 may enter the recesses, as shown, to afford a firm connection between the rim and tread. The body of the wheel is also of standard construction, having the usual spokes 7, felly 8 and metal band 9 secured on the periphery of the felly. While the wheel and outer tire are both of the standard form and dimensions known commercially as "S. A. E." construction, a tire is employed which is usually two nominal sizes larger than the wheel, so as not to fit directly thereon, and thereby to provide an intervening space for receiving the special cushioning and connecting means which characterize my invention.

Fitting within and against the inner side of the rim 6 there is a reinforcing ring comprising a relatively thin annular metal plate of which the lateral edges form vertical side-flanges 10, while the intermediate portions 11 are bent so as to inclose and form the sides of a series of annular cells which are triangular in cross-section. By the said cellular form of the reinforcing ring the same is of great rigidity in proportion to its weight. Said cellular ring has a series of transverse openings for receiving transverse bolts 12 which are employed to secure to the sides thereof the flange-rings 13, the latter having portions which fit around the beveled lateral edges of the rim 6, as shown. Within the cellular reinforcing-ring, and filling the space between the same and the band 9, is the cushion-ring which comprises an annular body 14 of resilient rubber or rubber composition, having in both its inner and outer sides a series of pockets or air-spaces, and also having laid over its inner and outer surfaces sheets 15 and 16 of fabric or the like, the latter preferably being cemented or vulcanized to the body 14 so as to be substantially integral therewith. The pockets or air-spaces are preferably pyramidal in form, the base-portions thereof being coincident with the inner and outer surfaces of the cushion-body, and the outer spaces or pockets 17 being in staggered or alternating relation, both laterally and circumferentially, to the inner pockets or spaces 18.

At the lateral sides or edges of the cushion-body there are radially extending resilient side-rings 19 of which the inner and outer edges are secured respectively to the wheel and to the cellular reinforcing-ring. The outer or head-portions 20 of said resilient side-rings are substantially triangular in cross-section and fit in the spaces between the side-flanges 10 of the cellular reinforcing-ring and the adjacent triangular portions 11 thereof, being securely held therein by the transverse bolts 12. The inner or foot-portions 21 of the side-rings are also approximately triangular in cross-section and are retained between portions of angle-rings 22 and flange-rings 23. The latter are secured to the sides of the felly 8 by bolts 24 extending transversely through the same, and the outer edges of said flange-rings 23 extend beyond the band 9 so as to lap over the foot-portions 21 of the side-rings, being grooved to receive laterally projecting beads thereon, as shown. The angle-rings 22 have portions which extend into grooves in the flange-rings 23 adjoining the edges of the band 9, other portions lying against the outer face of said band, and angular portions which fit around the foot-portions 21 of the side-rings, the corners of the cushion-body 14 being beveled to provide space therefor, as shown.

It will be seen from the foregoing that, when the wheel provided with my improved cushion-tire is in use, the rubber tread 4 serves one of the usual purposes of a pneumatic tire, in that it is sufficiently resilient to be indentable by small obstructions, so that in passing over the same it is not necessary for the entire wheel to be raised. While serving the foregoing purpose, the tread-member may nevertheless be made of firm and durable material and is not subject to punctures and blow-outs. The other most important function of a pneumatic tire is performed by the cushion-body 14, the same absorbing and preventing the transmission to the vehicle of the many shocks and jars incident to the movement of the wheel over rough surfaces. The cellular reinforcing-ring, the flange rings 13 and the rim 6, together form a rigid annular body which is substantially non-deformable under the stresses to which it is subject, so that the weight upon the wheel is received by and distributed over practically one-half of the entire cushion-body, or all that portion lying at any moment below the horizontal plane of the wheel-axis. The compressibility of the cushion-body, due to the resilient nature of the material from which it is formed, is greatly increased by the provision of the pockets or air-spaces therein, the same providing space into which the material may be displaced when under pressure, and the resistance to compression increasing uniformly as the pockets become more nearly filled by the displaced material and the pressure of the confined air thus increased. By increasing or decreasing the relative size or the number of the air-spaces in the cushion-body, the yieldability thereof may be proportioned to the weight and load-capacity of the vehicle with which the wheel is used. The use of the described cushioning means, in connection with an ordinary standard solid-rubber tire, relieves the latter of a part of the blows and concussions to which it would otherwise be subjected, and thus prolongs the life thereof. When the outer tire is worn out by the abrasion and disintegrating action of the road-surfaces, it may readily be replaced with a new one, without interfering with the cushion-structure, by merely removing the bolts 12 and flange-rings 13, pressing the rim 6 laterally off the cellular ring, and then reassembling the parts with a new tire and rim. The resilient side-rings 19, having their edges securely fastened to the inner and outer annular metal parts between which the cushion-body is confined, prevent the entrance of all foreign matter between said annular metal parts when the cushion is so distorted that otherwise dirt and the like might enter the space normally occupied thereby.

Now, having described my invention, what I claim and desire to secure by Letters Patent is:

1. In a vehicle-wheel, the combination with a felly, a resilient tread, a metal rim carrying said tread, and a cushion-body disposed between said rim and the wheel-felly, of a reinforcing-ring for said metal rim disposed within the same and comprising a relatively thin annular metal plate formed transversely to inclose a series of annular cells of triangular cross-section, and means for securing the ring and cushion-body against lateral displacement.

2. In a vehicle-wheel, the combination with a tread member and a felly, of a member interposed between said tread member and felly and comprising a relatively thin annular metal plate formed transversely to inclose annular cells of triangular cross section, a cushion-body having pockets therein disposed between said felly and said metal plate member, and means for securing said metal plate member and said cushion-body against lateral displacement.

3. In a vehicle wheel, the combination with a resilient tread and its rim and a wheel including its rim, of a resilient member interposed between the tread rim and the wheel rim provided with an inner and an outer series of tapering air containing pockets, said pockets arranged whereby the side walls of each of the pockets under compression are gradually thickened and caused to flow into said pocket to reduce the volume of each of the pockets from the inner ends thereof to gradually compress the air in such pockets according to the loads placed on the vehicle.

4. In a vehicle-wheel, the combination with a pair of metal rings spaced concentrically, of a cushion-body of resilient material disposed between said rings, said cushion-body having therein two series of pyramidal air-pockets of which the base-portions open through the peripheral surfaces of the body adjoining the metal rings, and material covering said base portions of said pockets so that air will be confined in said pockets by said material, said pockets being interspaced and disposed in staggered relation to each other.

5. In a vehicle-wheel, the combination with a felly, and a resilient cushioning-body disposed around the peripheral part thereof, of a metal ring disposed around said cushioning-body so as to normally engage the outer surface thereof; said ring having at its lateral edges flanges forming the sides of annular recesses of substantially triangular cross-section, side-rings of resilient material arranged at the lateral edges of the cushioning-body, means for connecting the inner edges of said side-rings to the felly, said side-rings having at their outer edges head-portions adapted to fit in the annular recesses of the metal ring, and means for clamping the flanges of said ring against said head-portions to retain the same in said recesses.

6. In a vehicle-wheel, the combination with a felly, a resilient tread-member, a metal rim carrying said tread-member, and a cushion-body disposed around said felly, of a reinforcing-ring for said metal rim, comprising an annular metal plate disposed between said rim and the cushion-body, said plate having side flanges extending inwardly therefrom and intermediate portions formed to inclose a series of annular cells of triangular cross-section, side-rings of resilient material disposed laterally of the cushion-body, means for securing the inner edges of said side-rings to the felly, said side-rings having outer head-portions adapted to fit in annular spaces adjoining the side-flanges of the reinforcing-ring, flange-rings engaging the lateral edges of the metal rim and overlapping the lateral edges of the reinforcing-ring, and transverse bolts connecting said flange-rings and reinforcing-ring and retaining the head-portions of the side-rings within the annular spaces adjoining the side-flanges of the reinforcing-ring.

7. In a vehicle-wheel, the combination with a felly, a band fitting thereon, and a tread-member having a rim spaced concentrically from said felly-band, of a cushion-body of resilient material disposed between said rim and felly-band, said cushion-body having in both the inner and outer peripheral surfaces thereof series of laterally and circumferentially spaced air-pockets with their outer ends adjacent the rim and felly band, and strips of material closing the outer ends of said pockets to confine the air in said pockets, the sides of said air-pockets converging from said outer ends to terminate near the respectively opposite peripheral surfaces of the cushion-body, and the inner and outer series of pockets being interspaced relatively to each other, and means for preventing lateral displacement of said cushion-body.

8. In a vehicle wheel, the combination with a resilient tread and its rim, and a wheel including its rim, of a resilient member interposed between the tread rim and the wheel rim provided with a plurality of relatively small outwardly tapering air confining pockets arranged whereby the side walls of each of the pockets under compression are gradually thickened and caused to flow into each pocket to reduce the volume of each of the pockets under compression from the inner ends thereof and thereby gradually compress the confined air in such pockets according to the loads on the vehicle.

ARTHUR L. RUNYAN.